(12) United States Patent
Seibert et al.

(10) Patent No.: US 9,959,127 B2
(45) Date of Patent: May 1, 2018

(54) SYSTEMS AND METHODS FOR EXPORTING DIAGNOSTIC DATA AND SECURING PRIVILEGES IN A SERVICE OPERATING SYSTEM

(71) Applicant: Dell Products, L.P., Round Rock, TX (US)

(72) Inventors: Philip M. Seibert, Austin, TX (US); Yuan-Chang Lo, Austin, TX (US); Carlton A. Andrews, Austin, TX (US); Todd Erick Swierk, Austin, TX (US); Kurian George, Bangalore (IN); Dirie N. Herzi, Leander, TX (US); Danilo O. Tan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 102 days.

(21) Appl. No.: 14/727,784

(22) Filed: Jun. 1, 2015

(65) Prior Publication Data

US 2016/0350132 A1    Dec. 1, 2016

(51) Int. Cl.
| | | |
|---|---|---|
| *G06F 11/30* | (2006.01) | |
| *G06F 12/14* | (2006.01) | |
| *G06F 9/44* | (2018.01) | |
| *G06F 21/31* | (2013.01) | |
| *G06F 11/34* | (2006.01) | |
| *G06F 21/57* | (2013.01) | |

(52) U.S. Cl.
CPC ............ *G06F 9/4406* (2013.01); *G06F 11/34* (2013.01); *G06F 21/31* (2013.01); *G06F 21/575* (2013.01); *G06F 2221/2105* (2013.01)

(58) Field of Classification Search
CPC .......... G06F 9/4406; G06F 8/61; G06F 21/31; G06F 11/0778; G06F 11/0784; G06F 11/0787
See application file for complete search history.

(56) References Cited

U.S. PATENT DOCUMENTS

| | | | | |
|---|---|---|---|---|
| 7,360,073 | B1 * | 4/2008 | Billstrom | G06F 21/575 713/1 |
| 8,392,695 | B1 * | 3/2013 | Lachwani | G06F 11/0742 713/1 |
| 2004/0255067 | A1 * | 12/2004 | Wolford | G09G 5/363 710/302 |
| 2005/0050401 | A1 * | 3/2005 | Matsuki | G06F 11/0778 714/42 |
| 2007/0234037 | A1 * | 10/2007 | Toda | G06F 21/80 713/155 |
| 2007/0234064 | A1 * | 10/2007 | Nihei | G06F 21/34 713/183 |

(Continued)

Primary Examiner — Trong Nguyen
(74) Attorney, Agent, or Firm — Fogarty LLP

(57) ABSTRACT

Systems and methods for exporting failure and diagnostic data and securing privileges in a service Operating System (OS). In some embodiments, an Information Handling System (IHS) includes a processor; and a memory coupled to the processor, the memory having program instructions stored thereon that, upon execution by the processor, cause the IHS to: identify a malfunction; store malfunction data in a predefined location; detect the coupling of an external device to the IHS; and export the malfunction data from the predefined location to the external device.

18 Claims, 7 Drawing Sheets

(56) References Cited

U.S. PATENT DOCUMENTS

| | | | |
|---|---|---|---|
| 2008/0288782 A1* | 11/2008 | Iyer | G06F 21/80 |
| | | | 713/186 |
| 2009/0094295 A1* | 4/2009 | Murakami | G06F 11/0736 |
| 2010/0211687 A1* | 8/2010 | Jaber | G06F 21/55 |
| | | | 709/228 |
| 2013/0282951 A1* | 10/2013 | Kuo | G06F 21/575 |
| | | | 711/102 |
| 2013/0290789 A1* | 10/2013 | Wen | G06F 11/079 |
| | | | 714/37 |
| 2014/0006738 A1* | 1/2014 | Nagai | G06F 21/78 |
| | | | 711/163 |
| 2015/0086014 A1* | 3/2015 | Adkins | H04N 1/4486 |
| | | | 380/243 |
| 2015/0150096 A1* | 5/2015 | Yamaguchi | G06F 21/82 |
| | | | 726/4 |

\* cited by examiner

SYSTEMS AND METHODS FOR EXPORTING DIAGNOSTIC DATA AND SECURING PRIVILEGES IN A SERVICE OPERATING SYSTEM

FIELD

This disclosure relates generally to computer systems, and more specifically, to systems and methods for exporting diagnostic data and securing privileges in a service Operating System.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In many situations, an IHS may need to be serviced or supported. For example, the IHS may have hardware and/or software that needs to be fixed, updated, removed, installed, or replaced from time to time. To address these, and other problems, certain systems and methods described herein may enable a computer manufacturer or service provider to allow customers to have access to automated, simplified support actions or operations, for example, even when an IHS is not otherwise able to boot to its main Operating System (OS) or has other serious hardware or software failures.

SUMMARY

Embodiments of systems and methods for exporting diagnostic data and securing privileges in a service Operating System (OS) are described herein. In an illustrative, non-limiting embodiment, an Information Handling System (IHS) may include a processor; and a memory coupled to the processor, the memory having program instructions stored thereon that, upon execution by the processor, cause the IHS to: identify a malfunction; store malfunction data in a predefined location; detect the coupling of an external device to the IHS; and export the malfunction data from the predefined location to the external device.

In various implementations, the IHS may be configured to identify the malfunction as a no-video malfunction in a pre-OS environment. The store, detect, and export operations are performed by the IHS in response to the no-video malfunction automatically and without manual input from any user. The external device may include a non-volatile memory (NVM) device with a Universal Serial Bus (USB) interface. The IHS may be configured to encrypt the malfunction data using a service tag assigned to the IHS and to store the malfunction data in an encrypted format. Also, the service tag may be assigned to the IHS by the manufacturer of the IHS prior to the IHS being shipped to a customer.

The IHS may be further configured to, prior to exporting the malfunction data, determine that the external device is authenticated by the manufacturer of the IHS, and export the malfunction data to the external device in response to the determination. For example, the predefined location may include a first encrypted partition, and the first encrypted partition may be distinct from a second encrypted partition where a main OS resides. The first encrypted partition may be accessible to a service OS when the second encrypted partition is inaccessible to the service OS.

The IHS may also be configured to: store a one-time password (OTP) seed in the predefined location at the time of manufacture of the IHS; install the service OS in the IHS, wherein a service OS root password is established using the OTP seed; and provide the OTP seed to a backend server, wherein the backend server is configured to associate the OTP seed with a service tag corresponding to the IHS.

The IHS may also be configured to: provide a technician with access to the predefined location in response to the technician having been authenticated by the backend server; and update the service OS root password to a next generated OTP value. The predefined location may be a Basic I/O System (BIOS)/Unified Extensible Firmware Interface (UEFI) mailbox.

In another illustrative, non-limiting embodiment a computer-implemented method may include identifying a malfunction; collecting malfunction data; encrypting the malfunction data using a service tag; storing malfunction data in a predefined location in an encrypted format; detecting the coupling of an external device; determining that the external device is authenticated; and in response to the determination, exporting the encrypted malfunction data from the predefined location to the external device.

In yet another illustrative, non-limiting embodiment, a storage device may have program instructions stored thereon that, upon execution by an Information Handling System (IHS), cause the IHS to: identify a malfunction; collect malfunction data; encrypt the malfunction data using a service tag; store malfunction data in a predefined location in an encrypted format; detect the coupling of an external device; determine that the external device is authenticated; and in response to the determination, export the encrypted malfunction data from the predefined location to the external device.

In some embodiments, one or more of the techniques described herein may be performed, at least in part, by an IHS operated by a user. In other embodiments, these techniques may be performed by an IHS having a processor and a memory coupled to the processor, the memory including program instructions stored thereon that, upon execution by the processor, cause the IHS to execute one or more operations. In yet other embodiments, a non-transitory computer-readable medium or memory device may have program instructions stored thereon that, upon execution by an IHS, cause the IHS to execute one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
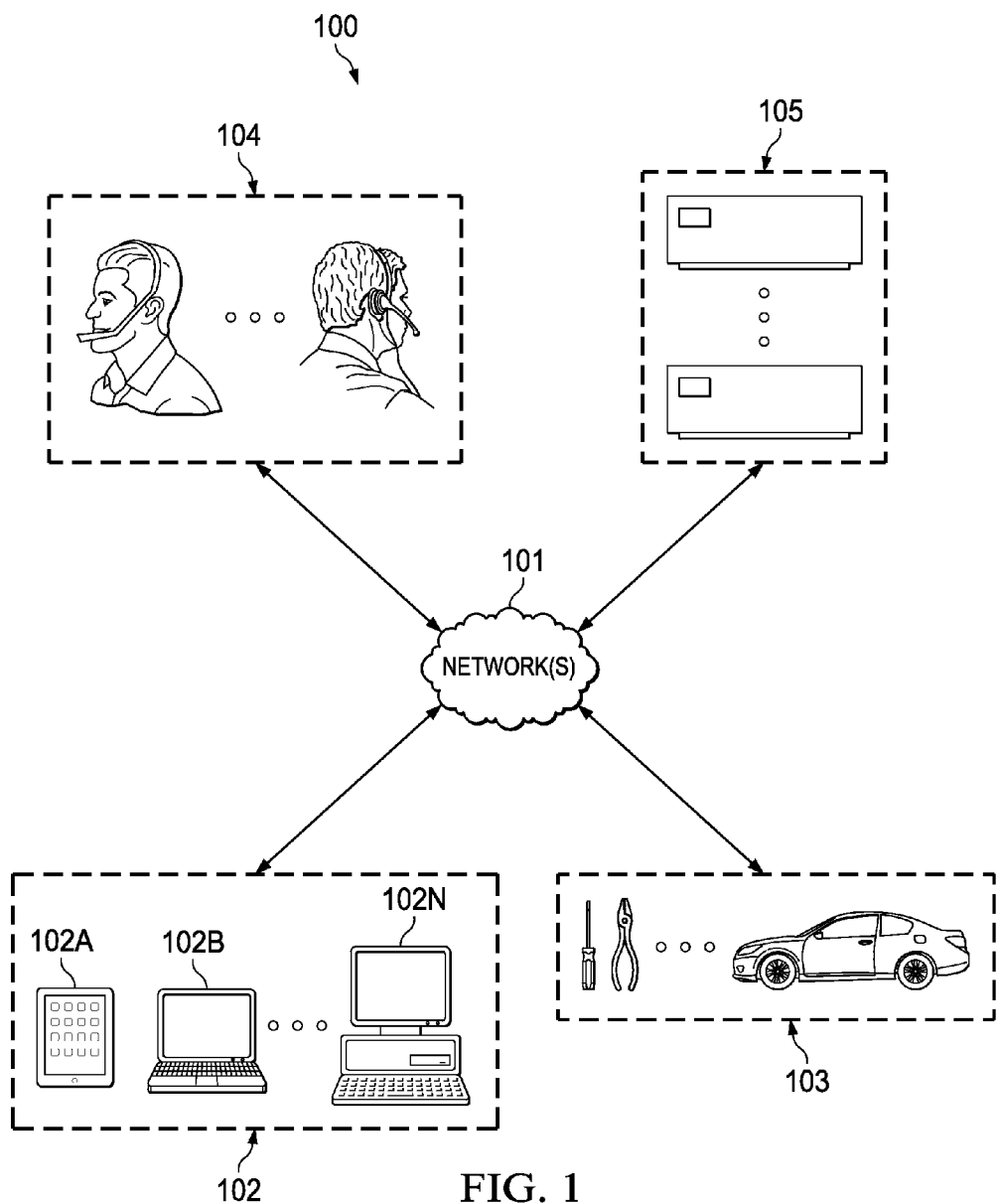
FIG. 1 is a diagram illustrating an example of an environment where systems and methods for providing service and support to computing devices may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

A. Overview

The inventors hereof have recognized a need for providing systems and methods for service and support to computing devices. Existing tools intended to facilitate service and/or support of a client device or Information Handling System (IHS) do not adequately address numerous problems, such as, for example, situations when the IHS fails to boot a main Operating System (OS) for any reason, whether due to a hardware of software problem, such that the IHS is said to be in a "degraded state." To address these and other concerns, embodiments described herein provide Basic I/O System (BIOS) and/or service OS-level intelligence to enable a client device to self-diagnose and to receive automated service and support. Additionally or alternatively, in some embodiments, the main OS may be modified to implement one of more of the foregoing features.

The term "degraded state," as used herein, refers to the state of an IHS that is not capable of booting a main OS (e.g., WINDOWS®, MAC OS®, LINUX®, etc.), either fully or partially (e.g., in WINDOWS®'s "safe mode" or the like). When operating in a degraded state, the IHS may still be able to execute BIOS instructions and/or a "service OS" (SOS).

The term "BIOS," as used herein, refers to a type of firmware used during an IHS's booting process (e.g., power-on, or reset). The BIOS initializes and tests an IHS' hardware components, and loads a boot loader or an OS from a memory device. The BIOS additionally provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term "BIOS," as used herein, is intended also encompass UEFI firmware and future variations thereof.

The term "service OS," as used herein, refers to one or more program instructions or scripts distinct from an IHS's "main OS" such that, upon execution by an IHS (e.g., upon failure by the IHS to load the main OS), enable one or more support, diagnostics, or remediation operations to be performed independently of the state of the main OS. The service OS may include one or more service and support applications, as described in more detail below. In some cases, an SOS may be stored in a recovery partition of a hard drive. Additionally or alternatively, an SOS may be stored in a Non-Volatile Memory (NVM) or flash memory built into the client system. Additionally or alternatively, the SOS may be stored in a remote location so as to allow an IHS to boot remotely "from the cloud."

In some embodiments, service capabilities may be invoked either "pre-boot" or "pre-OS." Pre-boot capabilities may be built into the BIOS/UEFI, and pre-OS capabilities may be provided by a service OS. For example, pre-boot services may include using enhanced BIOS diagnostics tools to detect hardware failure, providing a Quick Response (QR) code to simplify access to support services, etc. Meanwhile, pre-OS services may include enabling a service OS to provide customer automated assistance, using built-in remediation scripts to help diagnose and remediate the device, improve support efficiency using live chat, remote control support, etc. In some implementations, pre-boot services may be focused on "no-boot" scenarios, whereas pre-OS services may be focused on operations such as remediation, boot from web, re-imaging from web, etc.

As will be understood by a person of ordinary skill in the art in light of this disclosure, virtually any IHS environment that requires service or support may implement one or more aspects of the systems and methods described herein. Furthermore, certain aspects of the connected systems described herein may be implemented by computer manufacturers, software providers, and/or service or support companies.

B. Service and Support Architecture

Turning now to FIG. 1, a diagram illustrating an example of an environment where systems and methods for providing service and support to computing devices may be implemented is depicted according to some embodiments. As shown, each of any number of client devices 102A-N may be an IHS or other computing device (generically referred to as "IHS 102," "client 102," "client device 102," or "device 102") including, for example, desktops, laptops, tablets, smartphones, and any other all-in-one (AIO) data processing device. In some situations, devices 102 may be located in geographically distributed or remote locations, such as offices, homes, etc. Each device 102 may be operated by an individual end-consumer (e.g., lay person) or customer of a computer manufacturer or software provider, for instance. In some cases, two or more of client devices 102A-N may be deployed within or managed by the same organization (e.g., a business).

Tools intended to facilitate service and/or support of client devices 102 include service technicians 103, live support operators 104, and/or backend service 105. Service technicians 103 include trained employees or contractors that can travel to the site of device 102 or that can receive the physical device 102 (e.g., at a retail store, by mail, etc.) or part(s) thereof in order to make repairs, for example. Live support operator(s) 104 may be available, for instance, when device 102 fails but it is sufficiently operational that it can still connect the user to operator(s) 104 via chat, email, text messages, Voice-Over-Internet Protocol (VoIP) call, etc. Additionally or alternatively, the user of client device 102 may place a conventional phone call to live support operator(s) 104 (e.g., using a 1-800 number or the like). In some cases, live support operator(s) 104 may interactively guide the user in an effort to correct problems with client device 102 (e.g., troubleshooting).

Backend service 105 may include one or more servers and/or IHSs configured to perform one or more automated operations with respect to device 102. In various implementations, backend service 105 may be configured to communicate with a service OS prior to and/or independently of IHS 102 being able to boot a main OS, and it may enable one or more support, diagnostics, or remediation operations to be performed remotely including, but not limited to, telemetry, error reporting, tracking, chat, etc.

Entities 102-105 may have access to network 101. In various embodiments, telecommunications network 101 may include one or more wireless networks, circuit-switched networks, packet-switched networks, or any combination thereof to enable communications between two or more of IHSs. For example, network 101 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
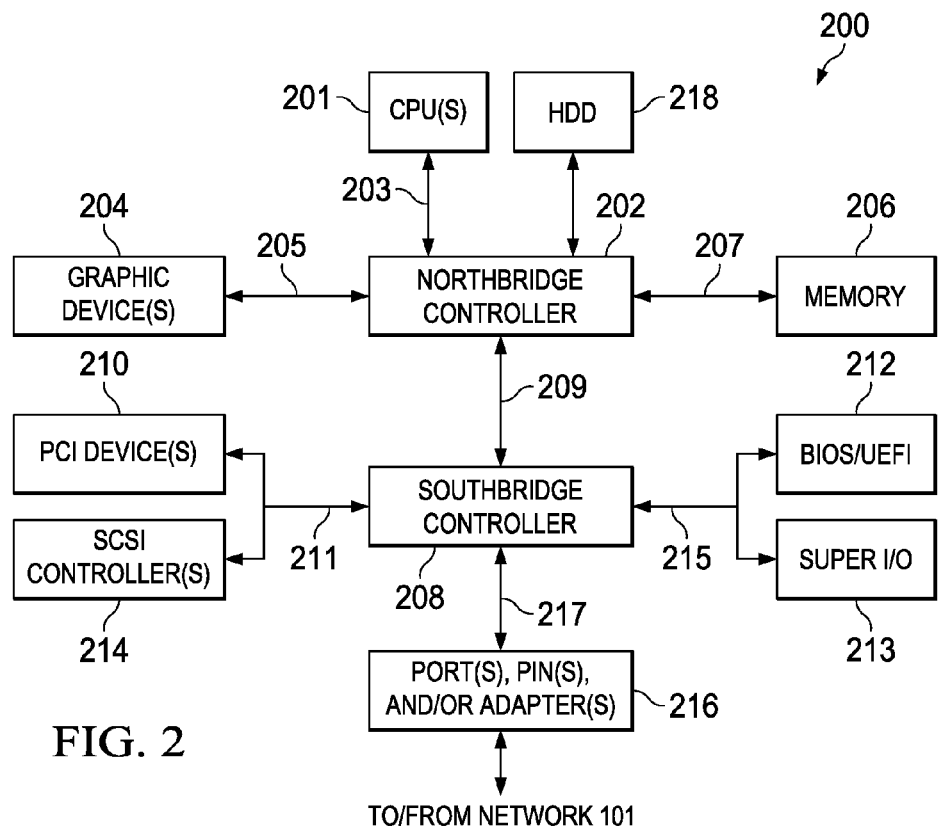
FIG. 2 is a block diagram of an example of an Information Handling System (IHS) according to some embodiments.

FIG. 2 is a block diagram of an example of an IHS. In some embodiments, IHS 200 may be used to implement any of computer systems or devices 102A-N and/or 105. As shown, IHS 200 includes one or more CPUs 201. In various embodiments, IHS 200 may be a single-processor system including one CPU 201, or a multi-processor system including two or more CPUs 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

CPU(s) 201 are coupled to northbridge controller or chipset 201 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like). Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial, parallel, Ethernet, or the like via port(s), pin(s), and/or adapter(s) 216 over bus 217. For example, southbridge controller 208 may be configured to allow data to be exchanged between IHS 200 and other devices, such as other IHSs attached to a network (e.g., network 101). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to Super I/O Controller 213 via Low Pin Count (LPC) bus 215. BIOS/UEFI 212 includes non-volatile memory having program instructions stored thereon. Those instructions may be usable by CPU(s) 201 to initialize and test other hardware components and/or to load an OS onto IHS 200. Super I/O Controller 213 combines interfaces for a variety of lower bandwidth or low data rate devices. Those devices may include, for example, floppy disks, parallel ports, keyboard and mouse, temperature sensor and fan speed monitoring/control, among others. In various implementations, southbridge controller 208 may be configured to allow data to be exchanged between BIOS/UEFI 212 and another IHS attached to network 101 (e.g., a remote server or other source of technical service) using wired or wireless capabilities of network adapter 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be added. Accordingly, systems and methods described herein may be implemented or executed with other IHS configurations.

Figure 3:
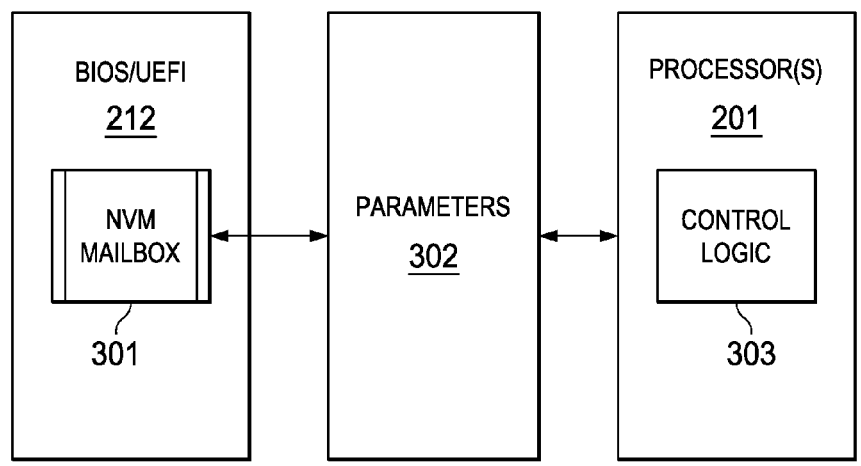
FIG. 3 is a block diagram of an example of a service Basic I/O System (BIOS) according to some embodiments.

As mentioned above, in various embodiments certain service capabilities may be built, at least in part, into a client device 102's BIOS/UEFI 212. In that regard, FIG. 3 shows block diagram of an example of BIOS/UEFI 212. Particularly, BIOS/UEFI 212 includes NVM mailbox 301 configured to store program instructions that, upon execution, provide and/or receive one or more service and support parameters or information 302 to or from control logic 303 of CPU(s) 201 to implement one or more service and support applications described in detail below. In some cases NVM mailbox 301 may serve as a "mailbox" to track issues and other information persistently. As noted above, however, at least a part of the aforementioned service capabilities may be provided via a service OS that is stored at least in part within a designated a partition of HDD 318, and/or on a remote IHS accessible to BIOS/UEFI 212 via network 101.

C. Service and Support Applications

In some embodiments, a variety of service and support applications may be at least partially embedded into BIOS/UEFI 212 and/or NVM mailbox 301, as described below.

i. Automated Hardware Client Device Service and Support

Systems and methods described herein may include a service and support application configured to provide automated services. In some embodiments, client device BIOS level intelligence may be provided to execute self-diagnosis and to assist in automated services. Service capabilities are built into client device BIOS diagnostics pre-boot, service OS on disk, or boot from cloud. Moreover, these capabilities may be integrated with a services backend for automated client device error reporting, tracking, chat, remediation, etc.

In some embodiments, an automated diagnostics procedure of an automated service and support application may include performing a BIOS diagnostics to discriminate hardware from software issues (e.g., broken HDD or corrupt OS). Then, BIOS/UEFI 212's NVM mailbox 301 may be used to track issues persistently from BIOS, pre-OS, OS, and/or backend sources.

Upon detection of a failure, a determination may be made as to the severity of that failure (e.g., whether the failure is severe, such as in a no-video situation, a no-network scenario, etc., or whether it is a simple failure, such as an OS problem), and remedial action(s) may then be taken by the automated service and support application as deemed appropriate. For example, if a network is not available, a Quick Response (QR) code or audio may be used to provide diagnostic failure and device identification information. Conversely, if the network is available, the automated service and support application may activate a "phone home" capability upon detection of a failure, and it may boot the client device to a service OS.

In that scenario, the client device may connect directly with a backend service Application Programming Interface (API) to initiate a warranty check (e.g., via hardware service tag as hardware ID), generate a service case, update debug data, initiate recovery or remediation operations, etc. In some cases, the automated service and support application may trigger an automatic dispatch of customer replaceable units (CRUs), parts, or components within the client device.

At the "point of need," which often coincides with the "point of failure," the automated service and support application may make service offers based on failure diagnoses. For example, such service offers may include an out of warranty upsell, warranty upgrade, additional service offers (e.g., HDD recovery for dead drive upsell), warranty carry in capability (e.g., report closest repair facilities for carry in service), etc.

Moreover, with respect to recovery and remediation, the automated service and support application may provide remote control, remote scripting/diagnostics, live customer support, backup, re-imaging and OS re-install via local factory image or via web, and the like.

ii. No-Video Support

Systems and methods described herein may include a service and support application configured to provide technical support in no-video situations, which are otherwise difficult to troubleshoot. In many cases, when client device 102 is not capable of outputting a video signal, users have no other option but to place a phone call to the manufacturer, because the device itself can provide no help.

To address this, and other concerns, a service and support application as described herein may include a audio-only support system, for example, similar to an automated phone support system or Interactive Voice Response (IVR), but that is local to client device 102 and capable of running in a pre-OS or pre-Boot environment. While a customer is interacting with the service and support application, client device 102 can run a diagnostics procedure. When appropriate, the service and support application may handoff the local automated audio support to online voice support from the IHS manufacturer. If network 101 is unavailable, client device 102 may prompt the user to connect directly to a nearby device distinct from client device 102 to perform one or more of these operations.

In some embodiments, the service and support application may include pre-OS availability of audio-based troubleshooting, offline audio support concurrent with diagnostics, and/or merging or handover between offline and online audio support. The service and support application may also prompt the user to make peer-to-peer (P2P) connection to a nearby device, readout codes for diagnosis/dispatch verification, and/or prompt the user to add or insert external storage to which to output diagnostic results.

iii. Mayday Beacon

Systems and methods described herein may include a service and support application configured to provide an automated and authenticated mayday beacon, with a cost-effective 1-to-1 support for verified client device 102's failures.

When client device 102 experiences a fault or hang before its main OS is made available, a wireless signal beacon (e.g., Bluetooth, Wi-Fi, etc.) may be sent (e.g., on a periodic basis) containing verification of the device credentials issued at the time of manufacture, details regarding the fault and a direct link to the manufacturer's support, decision tree location, and/or whether a premium account is linked. The beacon may be authenticated directly to a support representative with all failure information logged and available. This technique may prevent erroneous support calls by verifying the user has actually experienced a failure and authenticating that the proper support level has been funded, which promotes a low cost, one-on-one support service.

In some embodiments, the service and support application may be configured to broadcast a distress signal with credentials to make authenticated jump to a support site provided by backend services 105 from a secondary device or infrastructure. A certificate may be issued from the manufacturer containing client device 102's platform, user information, and/or service level. Such a certificate and a landing page for service may be passed automatically while client device 102 is out of service. Also, the service may be rendered utilizing secondary device or infrastructure via authenticated and verified client device 102 experiencing failure.

iv. Network-Based Recovery and Service

Systems and methods described herein may include a service and support application configured to provide network (e.g., Internet) recovery and service.

When client device 102 fails, it may "phone home" and boot, from backend services 105, a service OS to provide automated service and support. A service and support application in BIOS/UEFI 212 may include, for example, a boot loader, where to go (e.g., an IP address), booting proper image for machine, and/or a service application. As such, the service and support application may provide a smarter BIOS/UEFI 212, smart diagnostics in BIOS/UEFI 212, intelligent boot selection to local drive or web, and IP-awareness, among other features.

In some implementations, the service OS may be supported on many platforms and on many versions of those platforms. For example, a single platform (e.g., having a model name or number) may be shipped from the manufacturer with different hardware configurations (e.g., different CPUs, etc.), thus each combination of platform and version requiring that different, specific drivers be built into or provided for in the service OS.

In some embodiments, the service and support application may be configured to provide a Unified Extensible Firmware Interface (UEFI) BIOS module with smart diagnostics and IP support intelligently controls boot to a service OS. Client device 102 connects to backend services 105 to get proper and latest service OS for that particular device. Backend service or server 105 may receive a client manifest, and it may dynamically serve a service OS kernel, drivers, and a service application to client device 102 for recovery and/or remediation.

v. Reducing Perception of Wait Times

Systems and methods described herein may include a service and support application configured to improve customer experience while downloading a recovery OS by reducing the perception of wait time.

When client device 102 has a malfunction, it can boot to an alternate OS. In some cases, the alternate OS is downloaded via network 101 before client device 102 is able to boot. The download time is variable, often nontrivial, and may negatively affect customer perception. To counter this, the service and support application may estimate the download time of the alternate OS and, based on an assessment of the delay, may "pull forward" one or more low-bandwidth activities and/or options that the customer may need or desire to do anyway (e.g., updating contact information), thus helping save customer time and reducing the perception of delay.

In some embodiments, the service and support application may be configured to prioritize lower-bandwidth tasks based on estimated OS load time. Prioritization of activities may be based, for example, upon data about malfunction. As such, the application may enable user input or interaction while OS is downloading (e.g., updating contact information, describing the problem that happened before failure, etc.). The application may also submit a phone number for text alerts when failed client device 102 is ready, and it may start a local interactive debug troubleshooting operation while the OS is being downloaded.

vi. Identity Continuity in Service of Failed System

Systems and methods described herein may include a service and support application configured to provide identity continuity in the servicing of a failed client device 102.

When client device 102 fails and needs service, a user may need to enter service credentials on a service web portal provided by backend service or server 105, whether accessing the portal directly or via a service OS. However, the user may not recall such infrequently-used credentials at the point of need. By storing both a main OS's user credential hash and a service portal token, a service and support application can authenticate the user, and then automatically submit the service portal token to log user into the service portal without manual entry of customer credentials. This method may also be used to allow access to customers Wi-Fi profiles, and other type of data that needs protection.

In some embodiments, the service and support application may be configured to use a BIOS's "mailbox" to communicate one or more services token(s) to enable a single-sign-on procedure, while protecting the token(s) with user credentials.

vii. Smart Diagnosis and Triage of Failures

Systems and methods described herein may include a service and support application configured to perform smart diagnosis and triage of client device failures.

In some cases, the application may provide an automated method of hardware exoneration, identifying software versus hardware issues with targeted debug. POST may be used to detect issues during power on sequence, then those results may be used for firmware-based diagnostics for next level of hardware diagnostics. Main OS, POST and firmware based diagnostic results may be stored on the client device's BIOS's NVM or "mailbox" as device health data. In case client device 102 is not able to boot its main OS, a service OS may be started and uses health data to either run even more extensive hardware diagnostics or to run software fault detection and remediation test. Cloud connection to client device 102's manufacturer or backend service 105 may facilitate the download of updated tests, reporting of issues, and initiation of replacement parts dispatch.

In some embodiments, the service and support application may be configured to use a BIOS's NVM or "mailbox" to aggregate device health data. The application may use firmware and/or a service OS. Each stage of diagnostics may use information from previous diagnostics results to target more detailed but specific subsequent tests.

viii. Smart Diagnosis Using Hosted Resources

Systems and methods described herein may include a service and support application configured to perform smart diagnosis using hosted resources. When client device 102 cannot boot after repeated attempts, it may begin a process to perform self-evaluation and potentially self-repair operations. Because having all executable diagnostics and repair modules present in the non-bootable system would be costly, operations may involve successively loading software modules from a remote support source 105. But, modules loaded through internet/wireless networks 101 are likely slow to download, and therefore should be reduced or minimized to be tailored exactly as needed for a given process.

To address these, and other problems, in some embodiments a service and support application may be configured to upload test results to backend service 105, which automatically determines a subsequent module to be downloaded based on client device data and/or historic analysis of other client devices. The application may provide a remote boot of diagnostic and repair software modules. Appropriate modules may be selected and/or minimized to the next diagnosis stage in order to facilitate transfer over slow communications channels. A service may provide a reverse proxy for a hosted module to be loaded so that client device 102 may boot from a single Uniform Resource Locator (URL) for each process.

ix. Adaptive Boot Order

Systems and methods described herein may include a service and support application configured to intelligently alter a boot order to aid in automated client device diagnosis and repair. When client device 102 fails to completely boot, it does not move on to another component, as set in the boot order, if a previously attempted component remains available for boot. Often the process gets stuck trying to boot and repair the main OS indefinitely. The pre-set boot order remains static and unaltered.

In some embodiments, by building intelligence into BIOS/UEFI 212 for determining a boot order for client device 102, a service and support application may be configured to break out of a failing sequence and load alternative OSs and/or repair and diagnostic modules from various local or remotely available resources selected by their availability, performance, or content. Depending upon the success of each stage, client device 102 may change the boot order again to try another source. A successful repair may lead back to booting the main OS as the primary boot resource. An alternative or service OS may result as the final stage if the main OS cannot be made bootable.

In some embodiments, the service and support application may be configured to dynamically change a boot order based upon conditions of client device 102. The application may also set client device 102 in temporary or "permanent" boot orders based upon the completion stage of the diagnosis and repair.

x. Exporting of Failure and Diagnostic Data

Systems and methods described herein may include a service and support application configured to export failure and diagnostic data from a malfunctioning client device. Client device 102 may sometimes malfunction such that it cannot provide output or accept input from a user. It may still function at a low level, however, in order to capture its own failure codes and run diagnostics. These codes and diagnostic results are written to internal storage and are useful for system remediation, but unfortunately remain captive on the malfunctioning client device.

To address these, and other problems, a service and support application may create an embedded capability that is triggered by a malfunction, identifies the failure/diagnostics data, and exports the data upon insertion of an external storage device. The external device may then be taken to a functioning IHS or other client device, which can receive the data for local analysis and/or upload it for analysis or recordkeeping.

In some embodiments, the service and support application may be configured to export the data to an external device having a marker file. The marker file may be generated by an IHS manufacturer or software provider, and identifies the external device as belonging to an authorized service technician or other party. As such, a service mode may be provided for malfunction situations in which a user cannot interact with or extract data from failed client device 102. Normal behavior that occurs when inserting an external storage device may be overridden in the service mode, and instead client device 102 may export related failure/debug data to the external device. The service mode may be independent of the main OS. These, and other techniques, are described in more detail in "Section E" below.

xi. Technician Access to Service Data

Systems and methods described herein may include a service and support application configured to provide technician access to only services data on an encrypted drive. For diagnosis and remediation, client device 102 may use services data (e.g., system telemetry, failure and diagnostics data, services history, etc.). If a system has OS volume encryption (e.g., BitLocker) and fails over to a service OS, the service OS cannot typically access the services data due to encryption. That is, the latest and most valuable services data is trapped.

To address these, and other concerns, service and support application may create a separate services data partition in local storage (e.g., client device 102's own hard drive), also encrypted for consistency with user intent. The key for the services data partition may be different than the key used for the remainder of the volume encryption, and may be stored by backend service 105 with user permission to allow service technician 103 access in controlled support situations. As such, services data may be kept outside the inaccessible encrypted OS partition while still protected.

In some embodiments, the service and support application may be configured to create a services data partition that is encrypted differently (e.g., different key and/or encryption algorithm) than client device 102's main OS volume for purposes of services access. Access to the separately encrypted data may be useful to services applications and only visible to an authorized technician. Also, the application may provide the ability to pull encryption key from cloud and decrypt service data on device distinct from the client device, for example, using technician credentials (e.g., when network 101 is not accessible by client device 102). These, and other techniques, are described in more detail in "Section E" below.

xii. Protecting the Service OS Administrator's Password

Systems and methods described herein may include a service and support application configured to protect the service OS administrator's password while allowing technician one-time execution with elevated privileges. An initial password for a service OS may be created using a One-Time Password (OTP) technique and a seed stored on client device 102's BIOS/UEFI 212's NVM mailbox 301. The seed and a hardware service tag may be sent to backend services 105 to provide a mechanism for service technician 103 or live support operator(s) 104 to run privileged applications in the service OS without using a master password. In some embodiments, application of OTP in a support scenario may enable higher security for remote management and debug operations. NVM mailbox 301 may be used for storing initial seed at factory tied to the client hardware service tag. A service technician at failure time may generate a code to request administrator permissions. These, and other techniques, are described in more detail in "Section E" below.

xiii. Automatic Stop and Boot to Service OS

Systems and methods described herein may include a service and support application configured to provide automatic system stop and boot to a service OS for forensics analysis. In some embodiments, detection of suspicious activity for secure systems may result in automated boot to service OS with automated forensics lockdown and analysis outside the potentially compromised main OS. The application may combine security intrusion or behavior capabilities with a service OS to provide new forensics features. For example, detection of intrusion or malware in client device 102 may initiate lock down mode boot to the service OS. The service OS then connects or phones home to backend services 105 report a potential security incident, and initiates data forensics collection. Client device 102 may maintain a lockdown mode at BIOS level controlled by policy to maintain security of network 101 and data for forensic analysis.

xiv. Migrating Contents of an Internal Storage Partition

Systems and methods described herein may include a service and support application configured to migrate contents of an internal storage partition to a replacement storage device.

In some embodiments, data contained on a secondary partition of client device 102's internal drive storage may be migrated from an old or existing drive to a replacement or upgraded drive by storing it in Dynamic RAM (DRAM) while the drive is hot-swapped. If DRAM capacity is insufficient, overflow may be handled by external storage (e.g., USB drive), for example. In another embodiment, a Solid State Drive (SSD) portion may instead be a secondary partition on a standard hard drive. As such, an application may migrate a specified drive partition into DRAM, use external storage for data that exceeds the capacity of DRAM, and/or recognize and provisions replacement storage with contents of drive partition.

xv. Using a Service OS via a Hypervisor

Systems and methods described herein may include a service and support application configured to increase the effectiveness of a service OS by utilizing a custom hypervisor.

A conventional service OS may be configured to run on client device 102 only when the main OS is suspended. Such a conventional service OS may not be able to effectively monitor real-time events in the main OS as they occur. For example, a conventional service OS may only be able to examine the state of the primary disk, data, etc. using residual data collected by the main OS when the main OS was running. To address these, and other concerns, a service OS as described herein may run in a hypervisor (in a first tier next to the main OS, or in a second tier), and the hypervisor may allow the service OS full access to the resources of the primary OS. Accordingly, dynamic state of the primary OS may be monitored either constantly or periodically and actions and reports may occur immediately (a "watchdog" OS).

In some embodiments, a hypervisor environment may provide a service OS of client device 102 with full access to the resources of the main OS (but not necessarily vice-versa, for example, to keep the main OS from being corrupted). The service OS may run as a peer of the primary OS. The peer, service OS may be configured to monitor for process, memory, disk and other resources of the main OS, and may be allowed to alter them as required.

D. Methods for Providing Client Device Service and/or Support

Figure 4:
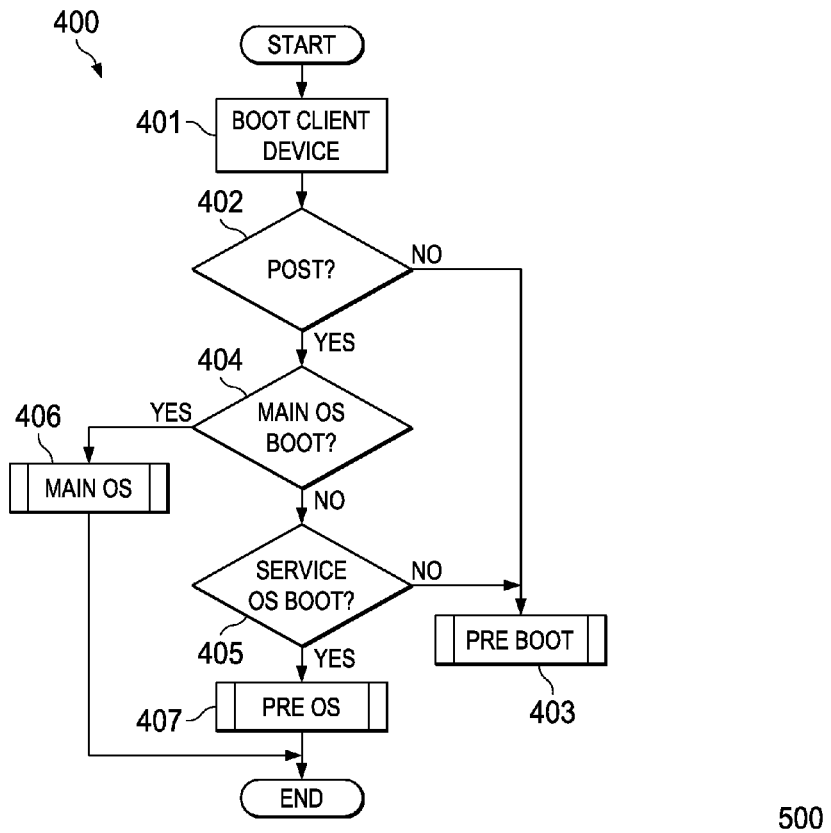
FIG. 4 is a flowchart of an example of a method for providing service and support in a computing device according to some embodiments.

FIG. 4 is a flowchart of a method for providing service and support in a computing device. In some embodiments, method 400 may be performed, at least in part, by BIOS/UEFI 212 and/or CPU(s) 201 of client device 102, for example, when client device 102 is operating in degraded state (e.g., no video, hard drive fault, etc.).

At block 401, method 400 includes attempting to boot client device 102. For example, block 401 may be executed in response to a power-on or reset event. Block 402 determines whether a Power-On-Self-Test (POST) procedure has been successfully performed upon client device 102 by BIOS/UEFI 212. If so, then block 404 determines whether a main OS has been successfully booted. In some cases, a successful boot of the main OS may include a complete success; in other cases, however, a "successful" boot may include cases where the main OS is booted in safe mode, or the like, with less than all of its functionality available to a user. If block 404 detects successful boot of the main OS, then control of client device 102 is passed to the main OS at block 406, and the method ends. In that case, support and/or service issues may be handled by the main OS.

Conversely, if the POST operation fails at block 402, service and support may be provided in a pre-boot environment at block 403. Examples of service and support procedures available to client device 102 in such a scenario include, but is not limited to, detecting network availability, use of QR codes or the like (with or without network connections), collection and transmission of telemetry data and/or event logs, alerts and indications of failures, and procedures for dealing with no-video scenarios, as outlined above.

If the main OS fails to boot at block 404, block 405 then determines whether a service OS can be booted. In some cases, the service OS may be initiated from a memory local to the client device. For example, the service OS may be stored in NVRAM or in a designated partition of HDD 218. Alternatively, the service OS may be loaded from a backend service 105 over network 101 (e.g., cloud boot). If the service OS is not capable of being booted at block 405, then service and support may again be provisioned within the pre-boot environment at block 403. Otherwise, service and support operations may be provided in a pre-OS environment at block 407, before method 400 ends.

In various implementations, BIOS/UEFI 212 may be configured to use a "boot strike count" as part of a failure detection procedure. That is, the number of unsuccessful main OS and/or service OS boot attempts may be kept by BIOS/UEFI 212, and that information may be used by one or more of the aforementioned service and support operations in subsequent boot attempts.

Figure 5:
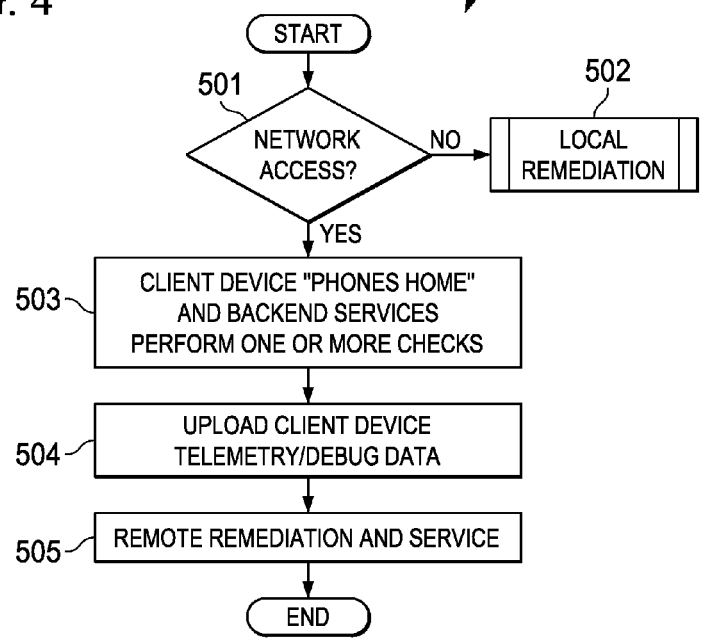
FIG. 5 is a flowchart of an example of a method for providing backend services and support to a computing device according to some embodiments.

As noted above, in some cases, service and support may be provided to a computer device such as client device 102 by backend services 105 via network 101. In that regard, FIG. 5 is a flowchart of a method for providing backend services and support to a computing device. In some embodiments, method 500 may be performed, at least in part, by BIOS/UEFI 212 and/or CPU(s) 201 of client device 102 in cooperation with backend services 105, for example, when client device 102 is operating in degraded state (e.g., no video, hard drive fault, etc.), either in pre-boot environment 402 or pre-OS environment 407 of FIG. 4.

At block 501, method 500 includes determining whether access to network 101 is available to client device 102. If not, then service and support operations may be provided as local remediation operations (e.g., QR code services, etc.) at block 502. If there is network access, however, block 503 includes client device 102 "phoning home" to reach backend services 105, which in turn may perform one or more checks. Examples of such checks include, but are not limited to, warranty and service entitlement checks performed using the client device 102's service tag or other identifying information such as the customer account token.

At block 504, method 500 includes uploading client device telemetry and/or debug data to backend services 105. For example, the telemetry and/or debug data may be used by backend service 105 to iteratively improve diagnostics and fault isolation. Then, at block 505, method 500 includes any number of remote remediation and service operations performed by backend services 105. Examples of such operations include, but are not limited to, auto dispatch for CRUs, point of need services (such as warranty upsells, warranty upgrades, service offers, etc.), and HDD recovery (with optional reporting of closest location, office, or store available for carry-in service by the user). Other operations may include remote control of one or more components of client device 102, chat support, backup, re-imaging, OS re-install via local factory image or cloud, etc.

E. Exporting Diagnostic Data and Securing Privileges in a Service OS

To effectively address a system malfunction in a client device, a service technician may need to access both failure and diagnostic data, and may also need to have administrative privileges within a service OS. In many cases, however, a malfunctioning client device may be unable interact with a user or technician. For example, a client device may experience a severe malfunction that prevents it from being able to input or output information to a user; yet it may still be capable of operating at a level sufficient to capture own failure codes or diagnostics data. These codes and diagnostic results are written to internal storage and are useful for subsequent remediation procedures, but unfortunately remain captive on the malfunctioning device.

Additionally or alternatively, the malfunctioning client device may have security measures in place that make it unwise or impossible to provide the access to service data (e.g., failure codes, results of diagnostic procedures, etc.). For example, the client device may have a main OS volume encryption. If service data is stored on this volume, it cannot be accessed by a service technician via a service OS due to the encryption.

In addition to desiring access to service data, a technician may need to obtain administrative privileges within a service OS to effectively remediate an issue. Nevertheless, diagnostic data used to debug a malfunctioning client device may contain personally identifiable information (PII). And, in a failed client that cannot provide output or accept input from a user, PII is written locally or exported to removable storage and therefore should be protected. Also, the diagnostic data is often stored on the main storage device of the malfunctioning client device. If full disk or volume encryption is enabled, the debug data may not be accessible. Moreover, when a service OS is utilized, a technician may need administrative privileges that should be protected to help assist debugging the client device.

To address these, and other problems, systems and methods described herein may include a service and support application configured to export failure and diagnostic data from a malfunctioning device and to secure advanced privileges in a service OS.

In an embodiment, embedded capabilities may be added to client devices that are triggered by the detection of a malfunction (e.g., a no-video scenario, etc.). Failure and diagnostic data may be identified and exported automatically upon insertion of an external storage device, sometimes overriding otherwise normal behavior. The service data may then be uploaded and analyzed using another device (e.g., another working device, a technician's computer, a remote server, etc.).

For example, in some implementations, service data may only be exported to an external device having a marker file. The marker file may generated by a backend service, for instance, and identifies the storage device as belonging to a particular authorized service technician. Additionally or alternatively, the service data may be encrypted with a system identifier (e.g., a service tag) used as encryption key.

In another embodiment, one or more separate service data partitions (e.g., in a client device's hard drive) may be used in addition to a main OS and/or a service OS partition. Each partition may be encrypted with a different key and/or method. The encryption key for the service data partition may be stored with a manufacturer (e.g., backend service 105), and a user may allow a technician to retrieve the key from the backend service in controlled support situations. As such, service data may be kept outside inaccessible encrypted OS partition(s), but it is still protected. System telemetry, failure and diagnostic data, and service history of the client device may be written to the encrypted service partition.

In yet another embodiment, a method may be implemented for protecting a service OS administrator password by utilizing a one time password (OTP) that allows only an authorized technician to securely access and run privileged commands on a malfunctioning client device. An initial password for the service OS may be created using OTP and a seed stored on the malfunctioning client device's NVRAM (e.g., BIOS/UEFI 212's NVM mailbox 301). The seed and hardware service tag may be sent to backend service 105 providing a mechanism for a support technician to run privileged applications in the service OS without using a master password. For example, a service technician at failure time may generate a code to request administrative permissions.

Figure 6:
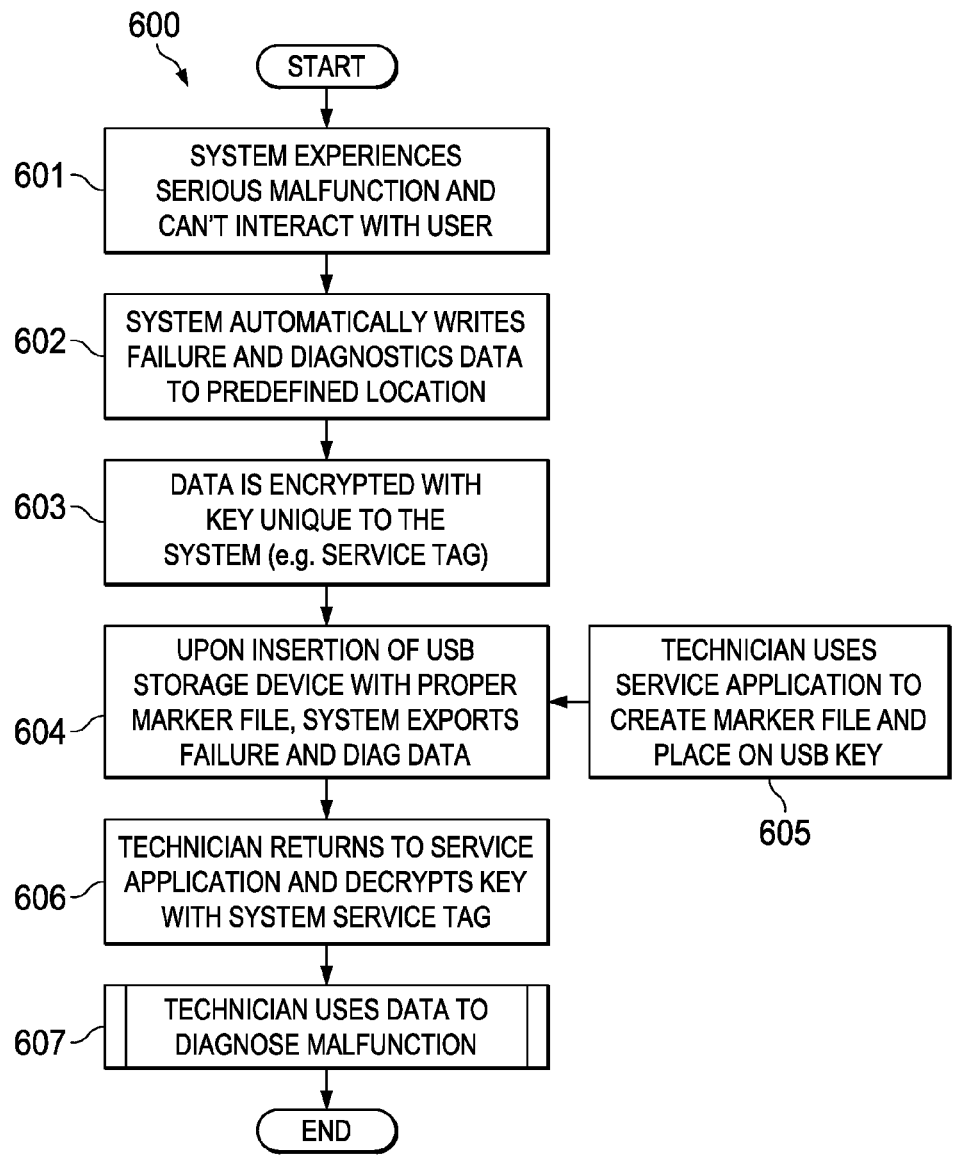
FIG. 6 is a flowchart of an example of a method for exporting diagnostic data according to some embodiments.

FIG. 6 is a flowchart of an example of a method for exporting diagnostic data. In various embodiments, method 600 may be performed, at least in part by a malfunctioning client device (e.g., one of client devices 102) under control of instructions stored in BIOS/UEFI 212. At block 601, the client device experiences a malfunction and cannot interact with the user. For example, a video card or controller failure may cause the client device to stop providing a graphical interface to a user. At this point, the user would ordinarily be unable to interact with the malfunctioning client device, even if the client device could continue to operate in some respects.

However, at block 602, the client device, in response to the malfunction, automatically writes service data (e.g., failure and diagnostics data) to a predefined memory location, for instance, in NVM mailbox 301 (e.g., NVRAM) or a dedicated services data partition of HDD 218. Then, at block 603, the service data may be encrypted with a key unique to the client device (e.g., a service tag or other identifying information).

At block 604, upon a determination that an external storage device (e.g., a USB drive, etc.) has been inserted into a corresponding port of the malfunctioning client device, the client device exports the service data to the storage device.

In some cases, upon insertion of the storage device, the malfunctioning client may check whether the storage device has a proper marker file. For instance, at block 605, a technician may have previously used a service application to create a marker file (e.g., provided by a backend service in communication with the service application) and to place that file on the external storage device.

After the service data is automatically exported to the external storage device having the proper marker file, at block 606 the technician may return to the service application and decrypt the service data using the proper key (e.g., also provided by the backend service). The technician may then use the service data to diagnose the malfunction at block 607.

Figure 7:
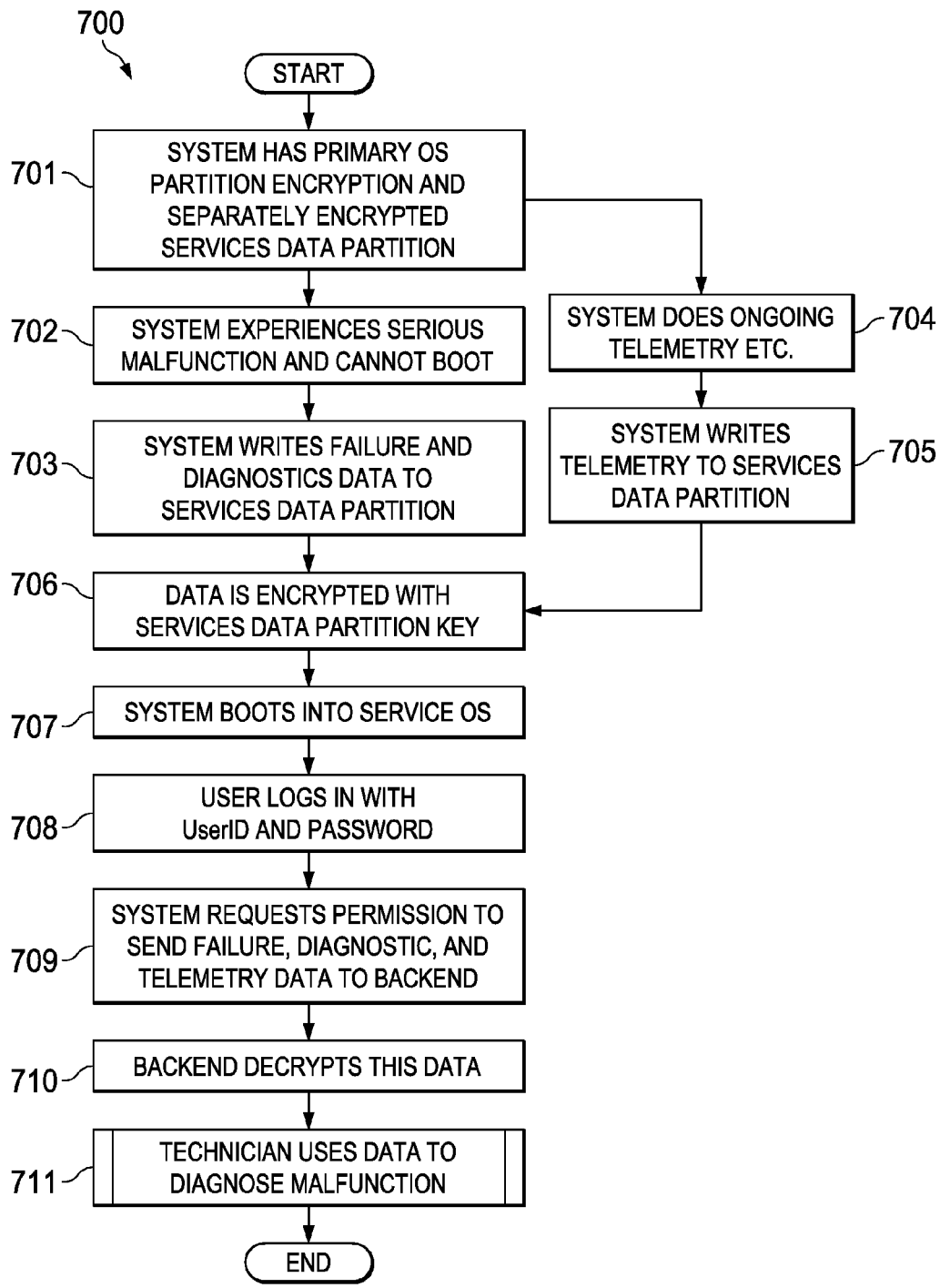
FIG. 7 is a flowchart of an example of a method for securing privileges in a service Operating System (OS) according to some embodiments.

FIG. 7 is a flowchart of an example of a method for securing privileges in a service OS. In various embodiments, method 700 may be performed, at least in part by a malfunctioning client device (e.g., one of client devices 102) under control of instructions stored in BIOS/UEFI 212. At block 701, a client device has an encrypted main OS partition and a separately encrypted service partition. For instance, the main OS partition may be encrypted with a first encryption key and/or encryption method, and the service partition may be encrypted with a second encryption key and/or encryption method. These two partitions may be stored, for example, in HDD 218. Then, at block 702, the client device experiences a malfunction and cannot boot. At block 703, the malfunctioning client device writes service data (e.g., failure and diagnostics data) to the service partition.

Concurrently with blocks 702 and 703, at block 704 the client device performs telemetry determinations on an ongoing basis and at block 704 it writes the resulting telemetry data to the service partition. Examples of telemetry data include, but are not limited to, system event logs, data on physical state of the device such as HDD health, thermal data, system configuration data (changes in particular), power data, system performance data, etc. Then, at block 705, the service data, along with telemetry data, are encrypted with a service partition key.

At block 707, the malfunctioning client device boots into a service OS. In some cases, the service OS may be stored in yet another partition with yet another encryption key and/or method. At block 708, the use logs into the service OS with a user ID and password.

At block 709, the malfunctioning client device requests permission from backend service 105 to send failure, diagnostic, and telemetry data over network 101. Upon receiving the data, backend service 105 decrypts the data at block 710, and at block 711 a technician uses data to diagnose the malfunction.

Figure 8:
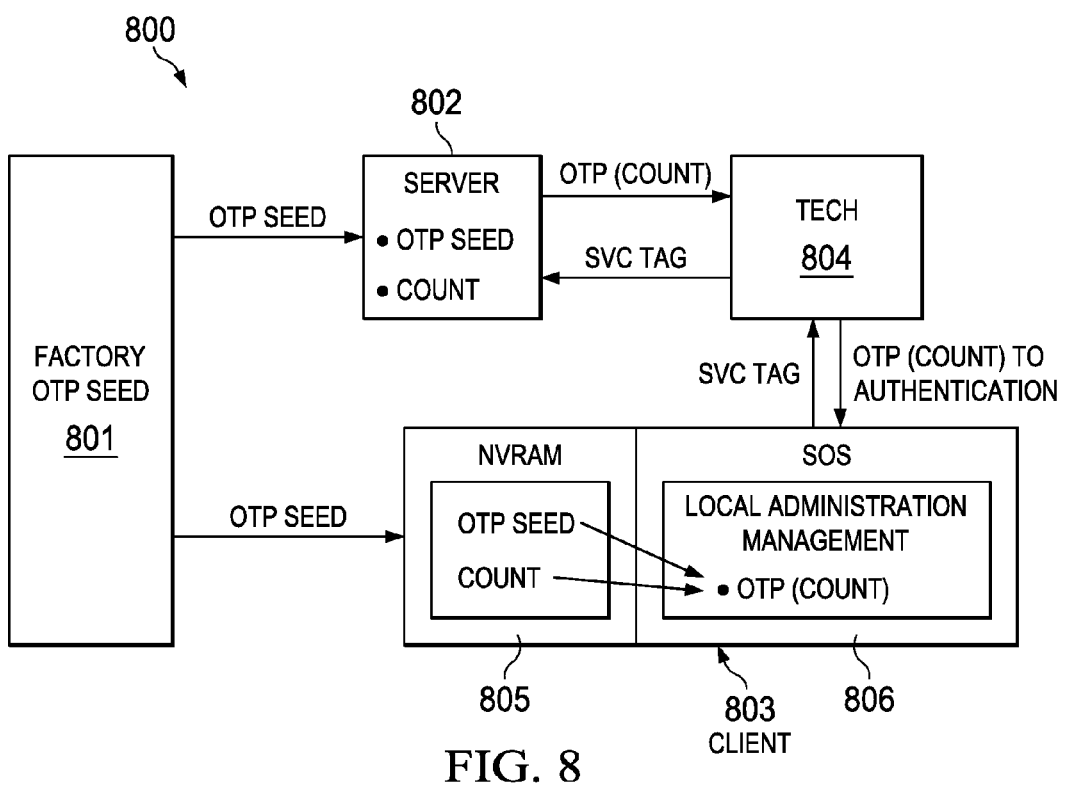
FIG. 8 is a diagram of an example of a system for protecting a service OS administrator's password while allowing technician one-time execution with elevated privileges according to some embodiments.

FIG. 8 is a diagram of an example of a system for protecting a service OS administrator's password while allowing technician one-time execution with elevated privileges according to some embodiments. Particularly, in system 800, prior to leaving factory 801 (or manufacturing, service, or distribution facility), a client 803 (e.g., one of client devices 102) and server 802 (e.g., backend service 105) both receive an OTP seed. Client 803 includes NVRAM 805 and service OS memory 806.

Technician 804 (e.g., live support 104), when attempting to access a local administrative management component of service OS 806, for example, may retrieve a service tag (or other identifying information) from client 803 and may send the service tag to server 802. Server 802 may then provide a current OTP count to technician 804, which then provides that information to service OS 806. Service OS 806 may then verify the technician's credentials against information stored in NVMRAM 205. These operations are illustrated in more detail with respect to FIG. 9.

Figure 9:
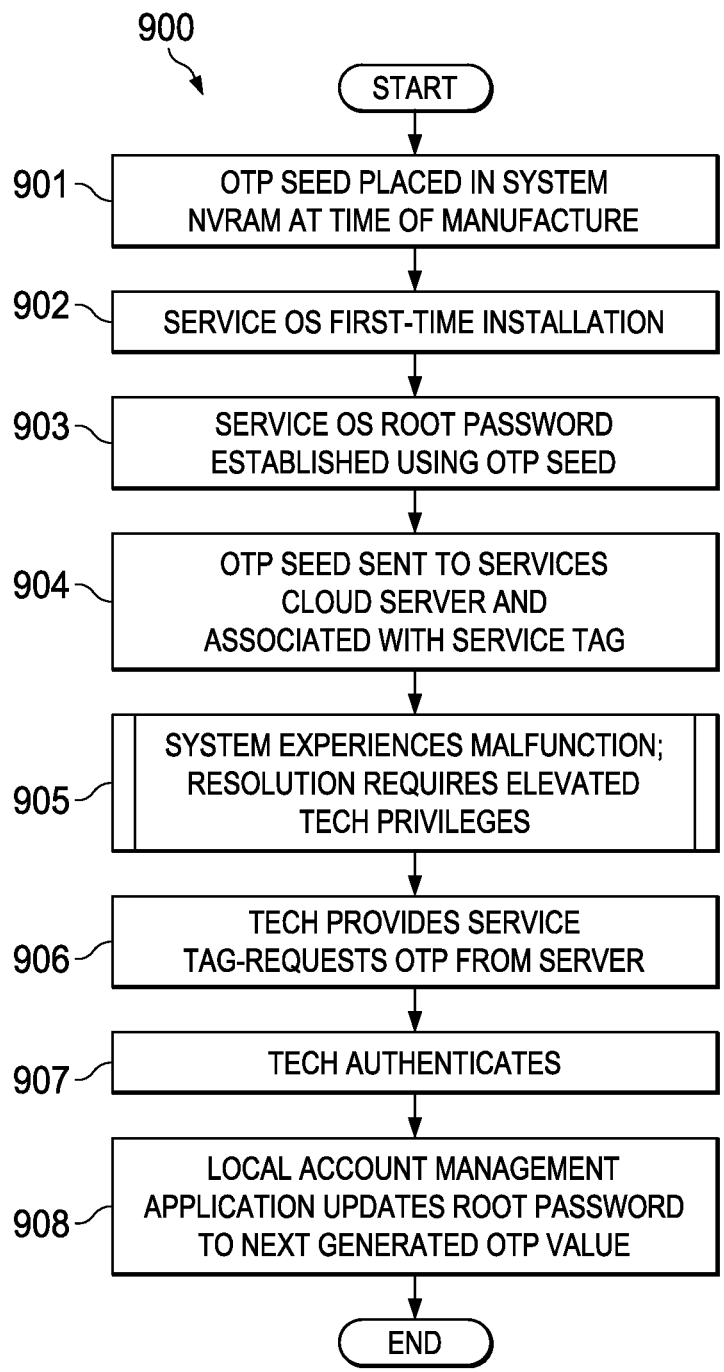
FIG. 9 is a flowchart of an example of a method for protect the service OS administrator's password while allowing technician one-time execution with elevated privileges according to some embodiments.

Particularly, FIG. 9 is a flowchart of an example of a method for protect the service OS administrator's password while allowing technician one-time execution with elevated privileges. In some embodiments, method 900 may be performed by system 800 of FIG. 8. At block 901, an OTP seed may be placed in a client's device NVRAM at the time of manufacture. A service OS is installed, for the first time, at block 902. At block 903, the service OS root password is established using the OTP seed. At block 904, the OTP seed is sent to backend services 105, for example, and associated with the client device's service tag.

At block 905, the client device experiences a malfunction such that resolution requires elevated technician privileges. Thus, at block 906, the technician provides the service tag of the malfunctioning client device to the backend service, and requests an OTP for that device. The technician is authenticated at block 907, and a local account management application updates the root password to the next generated OTP value using the OTP count at block 908. After each request, the current OTP may be maintained updated both in the backend service and within the client device by incrementing an OTP count.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
identify a malfunction as a no-video malfunction during a Power-On-Self-Test (POST) procedure carried out by a Basic Input/Output System (BIOS) in a pre-Operating System (OS) environment;
launch an audio-only support system in response to the identification;
collect malfunction data associated with the no-video malfunction;
encrypt the malfunction data using a service tag assigned to the IHS by a manufacturer of the IHS prior to the IHS being shipped to a customer;
store the encrypted malfunction data in a predefined location;
detect a coupling of an external device to the IHS;
detect a marker file stored in the external device, wherein the marker file indicates that the external device belongs to an authorized service technician;
determine that the external device is authenticated based upon the marker file; and
export the encrypted malfunction data from the predefined location to the external device in response to the determination.

2. The IHS of claim 1, wherein the storage of the encrypted malfunction data, the detection of the coupling of the external device, and the exportation of the encrypted malfunction data are performed by the IHS in response to the no-video malfunction automatically and without manual input from any user.

3. The IHS of claim 1, wherein the external device includes a non-volatile memory (NVM) device with a Universal Serial Bus (USB) interface.

4. The IHS of claim 1, wherein the program instructions, upon execution by the processor, further cause the IHS to encrypt the malfunction data using information distinct from the service tag.

5. The IHS of claim 1, wherein the program instructions, upon execution by the processor, further cause the IHS to, prior to exporting the encrypted malfunction data, determine that the external device is authenticated by the manufacturer of the IHS, and export the encrypted malfunction data to the external device in response to the determination that the external device is authenticated by the manufacturer of the IHS.

6. The IHS of claim 1, wherein the predefined location includes a first encrypted partition, and wherein the first encrypted partition is distinct from a second encrypted partition where a main OS resides.

7. The IHS of claim 6, wherein the first encrypted partition is accessible to a service OS when the second encrypted partition is inaccessible to the service OS.

8. The IHS of claim 7, wherein the program instructions, upon execution by the processor, further cause the IHS to:
store a one-time password (OTP) seed in the predefined location at a time of manufacture of the IHS;
install the service OS in the IHS, wherein a service OS root password is established using the OTP seed; and
provide the OTP seed to a backend server, wherein the backend server is configured to associate the OTP seed with a service tag corresponding to the IHS.

9. The IHS of claim 8, wherein the program instructions, upon execution by the processor, further cause the IHS to:
provide the authorized service technician with access to the predefined location in response to the authorized service technician having been authenticated by the backend server; and
update the service OS root password to a next generated OTP value.

10. The IHS of claim 8, wherein the predefined location is a Basic I/O System (BIOS)/Unified Extensible Firmware Interface (UEFI) mailbox.

11. A computer-implemented method, comprising:
identifying a malfunction as a no-video malfunction during a Power-On-Self-Test (POST) procedure carried out by a Basic Input/Output System (BIOS) in a pre-Operating System (OS) environment;
launching an audio-only support system in response to the identification;
collecting malfunction data associated with the no-video malfunction;
encrypting the malfunction data using a service tag assigned to an Information Handling System (IHS) by a manufacturer of the IHS prior to the IHS being shipped to a customer;
storing the encrypted malfunction data in a predefined location;
detecting a coupling of an external device;
detecting a marker file stored in the external device, wherein the marker file indicates that the external device belongs to an authorized service technician;
determining that the external device is authenticated based upon the marker file; and
in response to the determination, exporting the encrypted malfunction data from the predefined location to the external device.

12. The computer-implemented method of claim 11, wherein the predefined location includes a first encrypted partition, and wherein the first encrypted partition is distinct from a second encrypted partition where a main OS resides.

13. The computer-implemented method of claim 12, wherein the first encrypted partition is accessible to a service OS when the second encrypted partition is inaccessible to the service OS.

14. The computer-implemented method of claim 13, further comprising:
creating a one-time password (OTP) for the service OS;
storing a seed in a non-volatile memory (NVM); and
transmitting the seed to a backend service configured to allow the authorized service technician to execute an application using the service OS without using a master password.

15. The computer-implemented method of claim 14, wherein the NVM is a Basic I/O System (BIOS)/Unified Extensible Firmware Interface (UEFI) mailbox.

16. A storage device having program instructions stored thereon that, upon execution by an Information Handling System (IHS), cause the IHS to:
identify a malfunction as a no-video malfunction during a Power-On-Self-Test (POST) procedure carried out by a Basic Input/Output System (BIOS) in a pre-Operating System (OS) environment;
launch an audio-only support system in response to the identification;
collect malfunction data associated with the no-video malfunction;
encrypt the malfunction data using a service tag assigned to the IHS by a manufacturer of the IHS prior to the IHS being shipped to a customer;
store the encrypted malfunction data in a predefined location;
detect a coupling of an external device;
detect a marker file stored in the external device, wherein the marker file indicates that the external device belongs to an authorized service technician;
determine that the external device is authenticated based upon the marker file; and
in response to the determination, export the encrypted malfunction data from the predefined location to the external device.

17. The storage device of claim 16, wherein the predefined location includes a first encrypted partition, wherein the first encrypted partition is distinct from a second encrypted partition where a main OS resides, and wherein the first encrypted partition is accessible to a service OS when the second encrypted partition is inaccessible to the service OS.

18. The storage device of claim 17, wherein the program instructions, upon execution, further cause the IHS to:
create a one-time password (OTP) for the service OS;
store a seed in a non-volatile memory (NVM); and
transmit the seed to a backend service configured to allow the authorized service technician to execute an application using the service OS without using a master password.

* * * * *